United States Patent [19]
Sielaff et al.

[11] 3,796,096
[45] Mar. 12, 1974

[54] VORTEX FLOWMETER

[75] Inventors: Ulrich Sielaff, McFarland; John W. Miller, Portage, both of Wis.

[73] Assignee: Airco, Inc., New York, N.Y.

[22] Filed: July 6, 1972

[21] Appl. No.: 269,356

[52] U.S. Cl. ............................................. 73/194 B
[51] Int. Cl. ........................... G01f 1/00, G01p 1/00
[58] Field of Search ........................... 73/194 B, 228

[56] References Cited
UNITED STATES PATENTS

| | | | |
|---|---|---|---|
| 2,453,376 | 11/1940 | Lagassee | 73/194 |
| 1,935,445 | 11/1933 | Heinz | 73/194 |
| 3,116,639 | 1/1964 | Bird | 73/194 |
| 3,572,117 | 3/1971 | Rodely | 73/194 |

Primary Examiner—Herbert Goldstein
Attorney, Agent, or Firm—Roger M. Rathbun; Edmund W. Bopp; H. Hume Mathews

[57] ABSTRACT

A flowmeter for measuring fluid flow rates in an enclosed conduit. A symmetrical plate-like body is mounted in the conduit and is pivotable about a central axis. The body is positioned with a plane thereof normally transverse to the flow to be measured, the body being so dimensioned in relation to the conduit as to provide predetermined clearance between the conduit wall and each adjacent lateral edge of the plate. Fluid flowing about the lateral edges of the plate sheds vortices alternately from such edges at a rate related to the fluid flow velocity. Resulting unbalanced forces cause the body to oscillate between a pair of stops at a rate which is a function of the vortex shedding frequency and thus of the flow.

10 Claims, 4 Drawing Figures

PATENTED MAR 12 1974 3,796,096

VORTEX FLOWMETER

BACKGROUND OF INVENTION

This invention relates generally to flow measuring apparatus, and more specifically, relates to flow measuring apparatus wherein vortices induced in the flow stream are used to measure the flow of a fluid.

The phenomenon of vortex shedding is a well-known effect that occurs when a fluid is made to flow about a nonstreamlined, bluff body. If, for example, a cylindrical body is positioned in a flow stream with the axis thereof perpendicular to the said stream, eddies or vortices are formed on the downstream side of the body. The vortices actually grow adjacent the said downstream side, and upon reaching a certain size, break away and pass downstream at a frequency related to the rate of flow of fluid. The vortices are shed alternately on opposed sides of the body in a periodic manner, in consequence of which the ensuing flow pattern consists of a spatially oscillating trail of vortices, a so-called "vonKarman vortex trail."

Since the shedding frequency of vortices produced in accordance with the principles set forth above is related to the fluid flow rates, it has in the past, been proposed that by measuring the frequency of shedding, a simple scheme might be enabled for quantitatively ascertaining the flow. These various proposals have by and large not gained a high degree of acceptance, in that actual detection and measuring of the generated vortices is a technically difficult problem, and one that in the past has been dealt with by measuring a parameter such as local flow or pressure change, which parameters are not readily and dependably sensed without sophisticated instrumentation and attendant complex electronic circuitry. The problem becomes particularly acute at low flow rates, whereat the actual detection of downstream vortices becomes extremely difficult, due to the minute nature of the pressure and flow fluctuations.

In accordance with the foregoing, it may be regarded as an object of the present invention, to provide a flow measuring instrument utilizing the vortex shedding phenomenon, which is of simple construction, of highly dependable operation, and which incorporates relatively simple and low-cost electronic circuitry for providing the read-out thereof.

It is a further object of the present invention to provide a flowmeter based upon the vortex shedding phenomenon, which, while of simple, dependable design, nevertheless possesses high sensitivity and linearity, particularly at low flow rates, such as are normally experienced with respiration monitors or spirometers for measuring the exhaled breath of human patients.

SUMMARY OF THE INVENTION

Now, in accordance with the present invention, the foregoing objects, and others as will become apparent in the course of the ensuing specification, are achieved in a flow measuring instrument, utilizing a plate-like element mounted in an enclosed conduit in which flow is to be measured, as to be pivotable about a central axis thereof. The plate is so dimensioned that the lateral edges thereof are each spaced from the adjacent walls of the conduit, and the plate is normally oriented with the plane thereof transverse to the direction of flow. As the aforementioned vortices are shed alternately from the opposing lateral edges of the plate, pressure variations produce unbalanced forces which cause the said plate to undergo oscillations, the amplitude of which are limited by stops present in the conduit. The frequency of such oscillations are a function of the flow in the conduit, and are preferably detected by a method which causes an absolute minimum of interference with the plate's motion. A preferred method incorporates a light beam-photoelectric detection scheme whereby the plate cuts through the light path as it moves between the stops. The alternate occurrence of light at the photosensor is converted to electrical pulses which are connected by a suitable circuit, the ensuing counts per unit time being taken as a measure of the flow rate in said conduit.

BRIEF DESCRIPTION OF DRAWINGS

The invention is diagrammatically illustrated, by way of example, in the drawings appended hereto, in which.

DESCRIPTION OF PREFERRED EMBODIMENT

In FIGS. 1, 2, 3 and 4, sectional views are set forth of a flow measuring apparatus 10 in accordance with the present invention. Device 10 is seen to comprise a closed conduit 11, one end of which serves as an inlet 12 for fluid which is passed therethrough to the opposite end, whereat is defined an outlet 14. In accordance with the principles of the invention, apparatus 10 may be utilized for measuring either liquid or gas flow, provided that appropriate flow conditions are present as to enable the vortex shedding phenomenon. However, the present device is particularly applicable for the measurement of gas flow, and for example, is ideally adapted for measuring or monitoring gaseous flow rates from the lungs of a human being. In the latter connection, the flow parameters may be of interest, for example, in diagnosing the condition of a patient, or in monitoring flow rates to a patient being treated by respiratory apparatus or so forth.

Figure 1:
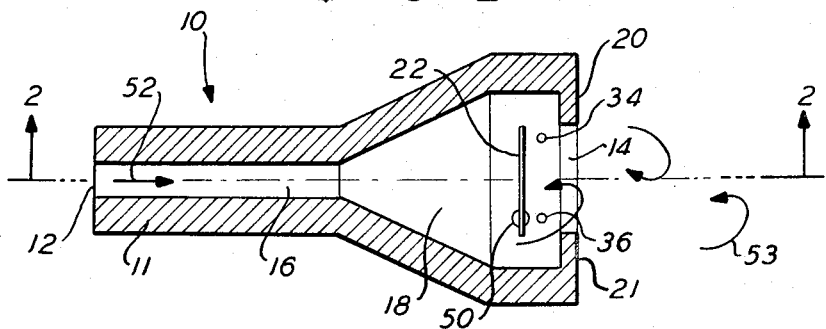
FIG. 1 is a cross-sectional view through apparatus in accordance with the present invention, the view being taken in a horizontal plane along the line 1—1 of FIG. 3 herein.
Figure 2:
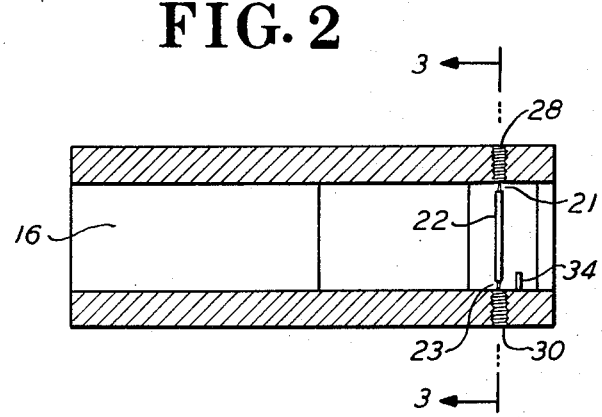
FIG. 2 is a cross-sectional view of the said apparatus taken in a vertical plane along the line 2—2 of FIG. 1.
Figure 4:
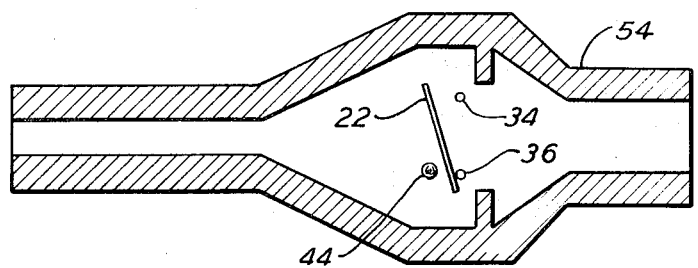
FIG. 4 is a cross-sectional view through apparatus including a typical variation of the geometry.

The conduit 11 defining apparatus 10 preferably includes an inlet flow nozzle portion 16, which is of relatively extended length and of constricted cross-section in comparison to the shroud portion 18 which flares out downstream from portion 16 and houses the oscillatable plate used to effect flow measurements. Downstream of the plate, the wall of the shroud once more is narrowed by the presence of side panels 20 and 21. In the configuration of FIG. 1, the device terminates at the said panels and may be used to measure flows which then escape to atmosphere. Should in-line flow sensing be desired, an additional adapting portion 54 may be provided downstream of the shroud to collect the flow. This latter configuration is shown in FIG. 4.

Mounted within shroud portion 18, there is seen a plate-like body 22. In the embodiment shown, the plate is of rectangular form, as is shroud 18 itself; however, it will be appreciated from the remarks that will ensue hence, that other geometries are within the province of the invention. The plate 22 may be formed of a lightweight material, is relatively thin, and preferably lateral edges 24 and 26 thereof are relatively sharp; the point here being that as such lateral edges define an interface at which turbulent flow generates vortices, it is deisred that such edges shall be configured as to discourage streamline flow. The plate 22 is seen to be mounted upon a pair of bearings 28 and 30, so as to be pivotable about a vertical, centrally oriented axis 32. Pivots 21 and 23 project from the plate 22 and engage bearings 28 and 30 in order to assure very low friction during pivoting of the plate. A pair of stops 34, 36 are mounted to the shroud wall and spaced slightly downstream from the plate 22 on alternate sides of axis 32. Such stops serve to limit the possible pivotable movement of plate 22 about axis 32 from its neutral position shown in FIG. 1. Plate 22 is provided with clearance on all edges thereof with respect to the adjacent conduit wall, and in particular, it is seen in FIG. 3 that spaces 38 and 40 are provided adjacent each lateral edge 24, 26 of the plate.

Figure 3:
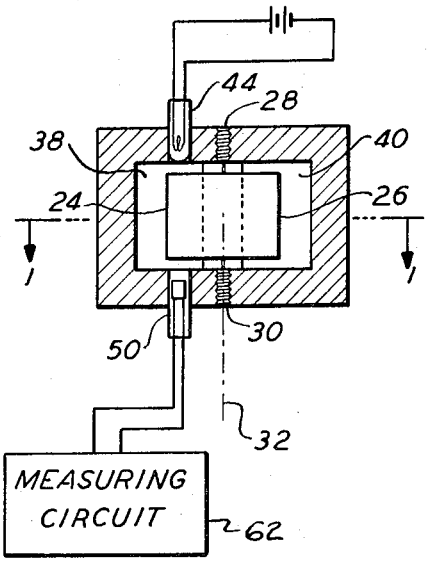
FIG. 3 is a transverse cross-section of the present apparatus taken along the line 3—3 of FIG. 2, such figure including a schematic depiction of several circuit elements used in accordance with the invention.

As is best seen in FIG. 3, plate 22 in its normal perpendicular position to the incoming flow stream interferes with a light beam emanating from light source 44. As the plate moves away from this normal position, light is presented with a free path to energize the photo sensitive receptor 50. Now, as the plate oscillates, each time it crosses the light path, energy to the photo receptor will momentarily be stopped and result in a variation of the electrical output from the sensor.

In accordance with the principles of the present invention, let it be assumed that gaseous flow is present in apparatus 10, such flow being assumed to proceed in the direction indicated by arrows 52. In accordance with the principles described earlier herein, vortices form alternately at the sharp lateral edges 24 and 26 of plate 22 as the flow proceeds through spaces 38 and 40. These vortices, shown downstream at 53, are alternately shed from the opposing lateral edges 24, 26, and in consequence thereof, the ensuing pressure differentials on the plate's surface effect oscillation of the plate 22 with an amplitude limited by stops 34 and 36. As the plate 22 thus oscillates, the light path between source 44 and receptor 50 is cut each time that the oscillating body moves through its central position. The ensuing signal from photo-sensor 50 is provided to a measuring circuit indicated generally at 62, which circuit in accordance with well-known principles in the art, may include an amplifying stage for amplifying the signal from the detector, and in addition counting circuits, frequency meters, or so forth, which circuitry acts to provide an indication of the frequency of oscillation of plate 22.

The von Karman vortex trail phenomenon, as is known to those skilled in the science of fluid mechanics, becomes a detectable manifestation of flow about circular cylinders, eliptical cylinders and flat plates at Reynolds numbers above, about 20. Fluid flow studies have shown that over wide flow ranges, stationary bodies positioned in uniform flow streams exhibit nonlinear shedding rates which are non-uniform in strength. Thus, prior flow measuring systems based on this principle normally have given intermittent strength, nonlinear signals.

The system described herein varies significantly from the experimental von Karman system in that (a) the vortex shedding body is not supported in a uniform flow stream; the upstream nozzle and abrupt variations in wall geometry account for this; and (2) the plate's oscillation amplitude is great enough to impose significant geometric changes on the system while fluid is flowing. These distinctions from other vortex flow sensing schemes result in significant improvements in low flow sensitivity and linearity over a broad flow range.

Over an extended range of flow rates in apparatus of the type treated in the invention, the rate of vortex shedding is generally a linear function of the gas velocity. Accordingly, particularly within the said linear range, a particularly simple calibration is enabled for the read-out provided by circuit block 62. By way of specific example, where apparatus 10 was dimensioned at to have at section 16, a cross-sectional flow area of 1.1 square centimeters with a plate of 2.6 square centimeters and an approximate cross-sectional flow area at section 14 of 2.5 square centimeters, it is found that the ensuing oscillatory rate of plate 22 was linearly related to the flow through conduit 11 over at least a range of flows from 5 to 120 liters per minute.

By varying the cross-sectional dimension of section 16, of shroud portion 18, and of side panels 20 and 21, various frequency-versus-flow curves can be obtained; numerous variations of these dimensions produce linear outputs. The frequency of oscillation at any flow can also be modified in this way. For example, by adjusting the frequency to 100 cycles per second at 1 liter per second flow, the plate will move once for each 10 cc's of fluid volume flowing through the apparatus. A decimal digital counter will, under such conditions, directly indicate the volume which has passed through the conduit over any given time.

While the present invention has been particularly set forth in terms of specific embodiments thereof, it will be understood in view of the instant disclosure, that numerous variations upon the invention are now enabled to those skilled in the art, which variations yet reside within the scope of the instant teaching. For example, while the oscillatable member of the present invention has been depicted as a plate-like element, it will be evident in consideration of the prior discussions of the von Karman vortex trail phenomenon, that other oscillatable bluff bodies may be positioned in the stream flow so as to similarly generate at opposite sides thereof the shedded vortices which effect the oscillation of such bodies. It should also be appreciated that while the circuitry utilized in accordance with the invention has been principally described in connection with providing an output indicative of flow rates, it will be clear that the developed signal can be integrated by standard techniques to provide an indication of total flow over a given period. An example of this aspect of the invention is cited in the preceding paragraph, the digital counter in effect integrating the signal furnished thereto. Accordingly, the present invention is to be broadly construed and limited only by the scope and spirit of the claims now appended hereto.

We claim:

1. A flowmeter for measuring the flow rate or volume of fluid passing therethrough, comprising in combination:

an enclosed conduit;

a plate-like bluff body mounted in said conduit and oscillatable on an axis passing centrally through said body, about a neutral position wherein said axis and the plane of said plate are transverse to the direction of fluid flow, said body being dimensioned so that the perimeter thereof is spaced from the adjacent walls of said conduit at said neutral position of said body and during displacements thereof about said axis, whereby fluid flow through said conduit generates a von Karman vortex trail from the said perimeter of said body, effecting oscillation of said body in accordance with the said flow; and means to detect the rate of oscillation of said body and convert the said detected rate to a signal indicative of said flow.

2. Apparatus in accordance with claim 1 further including a pair of stops spaced from said plate in its said neutral position, said stops being placed with respect to said axis to limit the amplitude of oscillations of said body.

3. Apparatus in accordance with claim 2 wherein said detection and conversion means comprises a light source and a photo-sensor positioned with respect to said light source so that the light path therebetween is intercepted at least once during each oscillation of said body, and means receiving the output from said photo-sensor for converting the intermittent signal therefrom to a read-out indicative of said flow.

4. Apparatus in accordance with claim 3 wherein said conduit includes an inlet flow portion and an enlarged shroud portion connected to said inlet portion, said shroud portion housing said mounted plate, light source, and photosensing means.

5. Apparatus in accordance with claim 2 wherein said plate is a flat rectangle, said lateral edges of said rectangle being sharp to facilitate generation of vortices defining said von Karman trail.

6. Apparatus in accordance with claim 1 further including means to integrate said signal with respect to time, thereby to provide an indication of the volume of said flow.

7. A method of measuring the flow rate of volume of fluid passing through an enclosed conduit, comprising the steps of:

locating a plate-like bluff body within the enclosed conduit in the flow path of the fluid to be measured, and spaced from adjacent walls of the conduit in a precetermined position;

mounting said plate-like bluff body for oscillatory motion of a maximum constrained amplitude in response to the flow of fluid thereby, said body being mounted so that said oscillatory motion is about an axis passing centrally through said body, the oscillating displacements being from a neutral position wherein said axis and the plane of said body are transverse to the direction of fluid flow, and the dimensions of said body being such that the perimeter thereof is spaced from the adjacent walls of said conduit at said neutral position and during displacements thereof during said oscillations;

detecting the oscillatory motion of said bluff body; and converting the detected oscillatory motion into a recognizable signal indicative of flow.

8. A method according to claim 7 wherein said bluff body comprises a symmetrical plate.

9. A method according to claim 8 wherein said oscillatory motion is detected by positioning a light source and photosensor with respect to one another such that the light path therebetween is interrupted at least once during each oscillation of said body.

10. A method in accordance with claim 9 wherein said rate of interception is measured to establish said signal indicative of said flow.

* * * * *

UNITED STATES PATENT OFFICE
CERTIFICATE OF CORRECTION

Patent No. 3,796,096                     Dated  March 12, 1974

Inventor(s)  Ulrich Sielaff and John W. Miller

It is certified that error appears in the above-identified patent and that said Letters Patent are hereby corrected as shown below:

Col. 2, line 9, the word "the" (second occurence) should read -- a --;

line 12, the word "connected" should read -- counted --.

Col. 3, line 44, the word "surface" should read -- surfaces --.

Col. 4, line 2, the "(a)" should read -- (1) --.

Col. 6, line 5, "of", second occurrence, should read -- or --;

line 11, the word "precetermined" should read -- predetermined --.

Signed and sealed this 24th day of September 1974.

(SEAL)
Attest:

McCOY M. GIBSON JR.                C. MARSHALL DANN
Attesting Officer                  Commissioner of Patents